Jan. 14, 1958  G. F. QUAYLE  2,819,811
EXTENDIBLE FORK TRUCK
Filed May 31, 1955  2 Sheets-Sheet 1
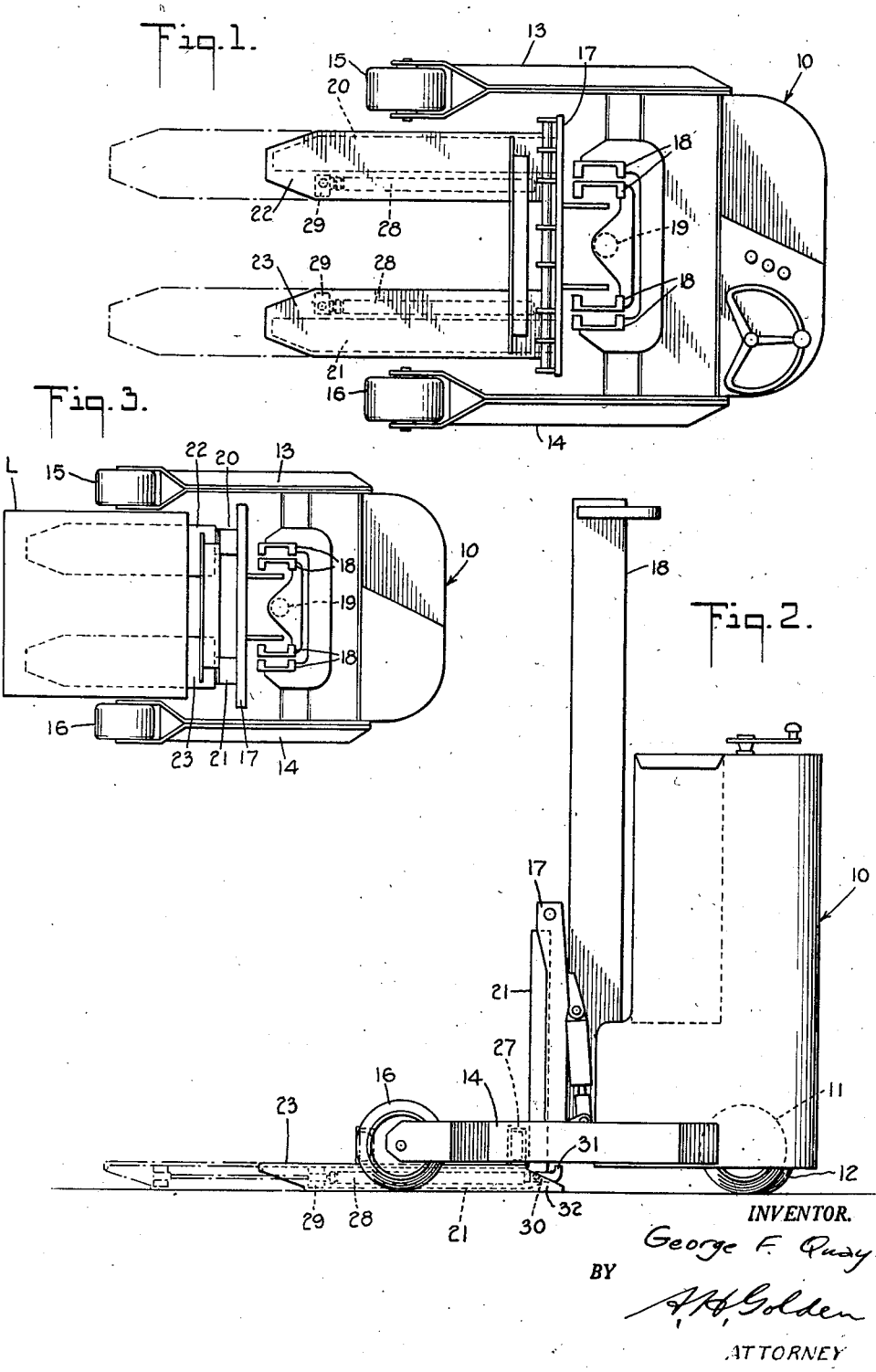
INVENTOR.
George F. Quayle
BY
A. H. Golden
ATTORNEY Jan. 14, 1958     G. F. QUAYLE     2,819,811
EXTENDIBLE FORK TRUCK
Filed May 31, 1955     2 Sheets-Sheet 2
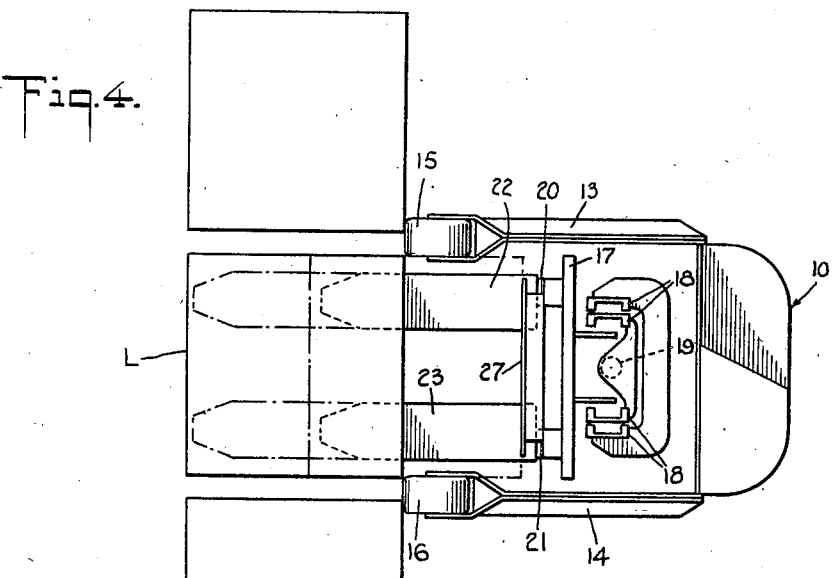
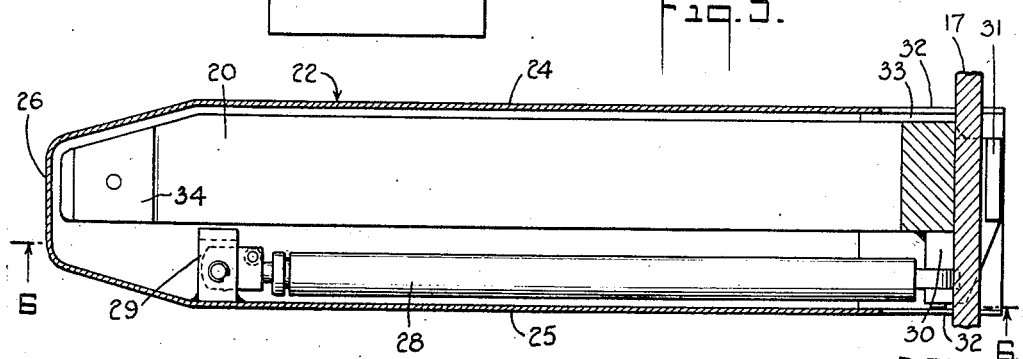
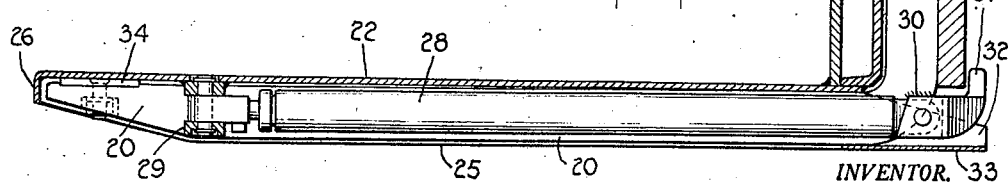
INVENTOR.
George F. Quayle
BY
A. H. Golden
ATTORNEY

United States Patent Office 2,819,811
Patented Jan. 14, 1958

2,819,811

EXTENDIBLE FORK TRUCK

George F. Quayle, Philadelphia, Pa., assignor to The Yale & Towne Manufacturing Company, Stamford, Conn., a corporation of Connecticut Application May 31, 1955, Serial No. 511,906

3 Claims. (Cl. 214—750)

This invention relates to an industrial truck, and more particularly, to an industrial truck adapted to lift a load and to stack or deposit that load in a narrow space between other loads.

Those skilled in the art will fully appreciate that when it is necessary to place a load into a narrow space in which the industrial truck cannot enter, the load must be moved beyond the end of the truck through some means. For the particular purpose, the art has adopted a load platform or load forks that are moved endwise relatively to the truck through a system of levers. Unfortunately, mechanisms of this class are very costly, and moreover, when the forks or platform are not extended, the leverage system occupies considerable room, so that the overall length of the truck relatively to its load carrying area is considerably increased. Where endwise movable extensions have been applied to platforms, they have not been adapted for low and high lift on platforms or forks supported at one end thereof, and movable relatively to widely spaced stabilizing legs. I do believe those skilled in the art will fully appreciate that while certain elements of my invention to be set forth below are per se old, the combination I shall describe is new and novel both in concept, utility and construction.

Those skilled in the art appreciate also, that when a load is moved to a position far beyond the frame of the truck, and particularly to a relatively high point, the truck is rendered extremely unstable, and if the load is offcenter, the truck will overturn. The truck of my invention utilizes supporting wheels that are extremely wide with relation to the load to be handled so as to yield a truck of great stability. At the same time, the load elevating platform or load forks, if the platform is to take the form of forks, are adapted in my truck for movement to an extremely high position, and are adapted further to move a load into a space into which the truck itself cannot move because of its extreme width. In other words, I obtain great stability through the wide spacing of the supporting wheels at the load end of the truck, but still retain for my truck the ability to handle loads that must be moved into spaces into which the truck cannot be manipulated.

As a particular feature of my invention, the platform of my truck, whether in the form of forks or otherwise, is unsupported except at one end, and is adapted for movement between a relatively widely spaced pair of wheel supporting legs at one end of the truck. The platform may move from an extremely low position against the ground and between said legs, to an extremely high position. Further, the platform, whether in the form of forks or otherwise, carries a load supporting plate that may slide linearly beyond the legs of the truck and into a space much narrower than that into which the truck may be manipulated.

As a further particular feature of the invention, the load supporting plate extends laterally beyond each fork, or beyond each side of the platform where a platform is used, forming a space into which may be positioned a ram secured at one end to the platform or forks and at the other end to the plate for moving the plate endwise, and thereby moving endwise the load. In this way, without sacrificing space in a vertical sense, a load may be supported in almost the same plane as the forks or platform while yet being movable beyond the truck and into a space considerably narrower than that in which the truck may enter. Thereby, I contribute the combination of a wide stable truck with forks moving vertically relatively thereto from a very low position to a very high position, and with the load moving endwise in all positions for stacking in a narrow space, all without increasing the length of the truck and without resorting to complex leverage systems.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may be readily utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

Referring now to the drawings:

Fig. 1 is a plan view of my novel truck.

Fig. 2 is a side view.

Fig. 3 shows my truck straddling a load.

Fig. 4 illustrates the manner in which my truck moves into lifting relation to a wider load.

Fig. 5 is a sectional view showing the details of the load platform.

Fig. 6 is a view on the line 6—6 of Fig. 5.

For the purpose of describing my invention, I show my novel truck constructed with a rather conventional front traction end 10. This traction end 10 is quite short, as well shown in Figs. 1 and 2, and is equipped at opposed sides with a driving and steering wheel 11 and a caster wheel 12. The actual details of the traction end 10 and its wheel arrangement are not important to an understanding of my invention, and it is necessary to know merely that the truck is steered and driven through its front end.

For supporting the rear end of the truck, I utilize a pair of legs 13, 14 that extend rearwardly from the opposed lower side portions of the front end 10, and that are equipped with a pair of rear wheels 15, 16. These wheels 15, 16 are positioned in widely spaced relation to one another and are very effective for stabilizing the truck, as will be understood by those skilled in the art. By stabilizing the truck, the wheels 15, 16, enable me to handle loads in an extremely novel way that will be appreciated as the description of my invention proceeds.

On the front traction end 10 of my truck I mount a load carriage 17 for vertical movement relatively to the space between the legs 13, 14. I show for the particular purpose a series of vertical uprights 18 on the front end 10, with a hydraulic lifting ram 19 for the carriage indicated by dotted lines in Fig. 1. I equip the load carriage 17 with a pair of load forks 20, 21, so arranged that they can move intermediate the legs 13, 14 and rear truck wheels 15, 16 when the carriage is lowered. Thus, forks 20, 21 can move practically into contact with the ground as shown in Fig. 2, so that they will be in position to coact with a load that has very little underclearance. Moreover, the wheels 15, 16 by their wide spacing will stabilize a load on the forks when the truck can straddle the load, as in Fig. 3. I shall now describe the novel structure whereby I enable the wheels 15, 16 to stabilize the load when, as in Fig. 4, it is not possible for the truck to straddle the load.

I further utilize in my invention a pair of load support plates 22, 23 that are mounted to slide longitudinally on the forks 20, 21. To hold the plates 22, 23, in aligned relation to each other in the different positions to which they slide, I connect the inner ends of the plates through an integral cross member 27, Figs. 4 and 6. The plates 22, 23 are alike, and therefore it will suffice to describe merely the details of the plate 22, as shown in Figs. 5 and 6. The load support plate 22 is formed with side flanges 24, 25 and an end flange 26 that are positioned about the sides and end of the fork 20. However, the plate 22 is somewhat wider than its fork, and extends laterally to leave a space between the side flange 25 and the fork. In this space I arrange a hydraulic ram 28, Figs. 5 and 6, that is actuated through suitable hydraulic means, not shown. I attach the outer end of the ram 28 to the plate 22 through a pivot bracket 29 welded to the plate, and I similarly attach the opposed end of the ram 28 to a pivot bracket 30 that is integral with the heel of the fork 20. I may, incidentally, form bracket 30 with a clip 31 that is utilized to hold the lower part of the fork on the load carriage 17 of the truck.

At the inner end of the load support plate 22, the side flanges 24, 25 extend to form end portions 32, best shown in Figs. 5 and 6. On these end portions 32 I mount a bearing member 33 that is adapted to slide along the bottom surface of the fork 20. I prefer also to equip the upper surface of the fork 20 near its outer end with a bearing member 34 on which plate 22 slides. The bearings 33, 34 enable the plate 22 to support a load as the plate moves either to an inner position intermediate the truck wheels 15, 16 as shown in Fig. 3, or to an extended position beyond those wheels as shown in dotted lines in Figs. 1 and 4. Since the load support plates 22, 23 are alike, it will be understood that each plate is moved by its particular ram 28, and that both plates act in the same way to support the load. Moreover, the cross member 27 holds the plates 22, 23 in aligned relation so that they are in effect an integral load platform.

The extremely novel features of my invention will be better understood if we now refer particularly to Fig. 4. It will be seen that the sliding support plates 22, 23 when extended relatively to the forks will be positioned outwardly a very considerable distance beyond the rear truck wheels 15, 16. It is possible, therefore, to extend the load support plates 22, 23 beneath a load L, Fig. 4, that is positioned beyond the wheels. It is extremely important to note also that the load support plates 22, 23 can be thus extended beneath the load when the load is quite close to the ground, and when the load forks of the truck must therefore be positioned substantially in contact with the ground. Thus, my novel truck can engage and lift the load L when that load is too wide to move into the space between the rear truck wheels 15, 16, as will be clearly apparent from Fig. 4. It is important to note also that my truck can handle the load when the load is in a space that is too narrow to admit the wheels 15, 16, as in Fig. 4. Once the load L is lifted a sufficient distance to clear the rear truck wheels 15, 16, the rams 28 can be actuated to slide the load support plates 22, 23 inwardly, thus positioning the load over the wheels 15, 16, so that the truck can carry the load with a very high degree of stability. In addition, the load when so positioned will not extend an extreme distance outwardly beyond the wheels 15, 16 and will allow the truck to be operated and turned in a relatively narrow aisle.

It will be appreciated, of course, that the sliding movement of the support plates 22, 23 enables my truck to handle loads that are stacked to a very considerable height, yet with the truck and the load stabilized through the widely spaced truck wheels 15, 16. In any case, the support plates 22, 23 may be moved inwardly through the action of rams 28 to place the load in a position above the wheels 15, 16, so that the load can be safely carried by the truck.

I have contributed by my invention an extremely novel lift truck that is very effectively stabilized, and that can carry a load without danger of overturning whether or not it is possible for the truck to straddle the load. My truck can, nevertheless, handle loads that have little underclearance. I accomplish these things, moreover, while making the truck quite short so that it can be maneuvered in a narrow aisle. I believe, therefore, that those skilled in the art will appreciate the very considerable advantages of my invention.

I now claim:

1. In a truck of the class described, a main frame comprising a forward traction end and a pair of legs extending longitudinally from the lower sides of said forward traction end, a wheel at substantially the end of each leg supporting one end of the truck, a traction unit at the said forward traction end, a pair of spaced vertical uprights for said truck positioned on said main frame rearwardly of said traction end, a load platform mounted for vertical movement on said vertical uprights from a lowermost position substantially against the ground and of such size that when fully lowered it lies entirely between said legs, a load support plate contributing a load surface for the platform and adapted to slide longitudinally on said load platform whereby to move said surface between one position substantially coextensive with said load platform and a position substantially beyond the ends of said legs, bearing members between the plate and platform supporting the plate as it slides with a load on its surface, and means for sliding the plate and its load on said bearing members to enable the truck to handle the load beyond the ends of said legs and also to carry that load in stabilized relation to the wheels.

2. In a truck of the class described, a main frame comprising a forward traction end and a pair of legs extending longitudinally from the sides of said forward end, a wheel at substantially the end of each leg supporting one end of the truck, a traction unit at the said forward traction end, a pair of spaced vertical uprights for said truck positioned on said main frame at the rear of said traction end, a load platform mounted for vertical movement on said vertical uprights and of such size that when fully lowered it lies betwen said legs, a load member contributing a load surface for said load platform and adapted for linear movement with said surface moving between one position substantially coextensive with said load platform and a position substantially beyond the ends of said legs, bearing members between the load member and platform supporting the load member as it moves with a load on its surface, and means for moving the load member and its load on said bearing members to enable the truck to handle the load beyond the ends of said legs and also to carry that load in stabilized relation to the wheels.

3. In a truck of the class described, a main frame comprising a forward traction end and a pair of legs extending longitudinally rearwardly from the sides of said forward end, a wheel at substantially the end of each leg supporting one end of the truck, a traction unit at the said forward traction end, a pair of spaced vertical uprights for said truck positioned on said main frame at the rear of said traction end, a pair of load forks mounted for vertical movement on said vertical uprights and of such size that when fully lowered said forks lie entirely between said legs and juxtaposed to the ground, a plate-like load member contributing a load surface for each fork and adapted for linear movement with said surface moving between one position substantially coextensive with said fork and a position substantially beyond the ends of said legs, bearing members between each load member and fork supporting the load member as it moves with a load on its surface, and means for moving together both load members and their load on said bearing members to enable the truck to handle the load beyond the ends of said legs and also to carry that load in stabilized relation to the wheels.

References Cited in the file of this patent

UNITED STATES PATENTS

| | | |
|---|---|---|
| 1,799,307 | Manley | Apr. 7, 1931 |
| 2,320,601 | Howell | June 1, 1943 |
| 2,536,068 | Lehmann | Jan. 2, 1951 |
| 2,574,045 | Lapham | Nov. 6, 1951 |
| 2,678,746 | Gibson | May 18, 1954 |
| 2,752,058 | Gibson | June 26, 1956 |